J. M. PALMER.
VALVE.
APPLICATION FILED OCT. 16, 1916.

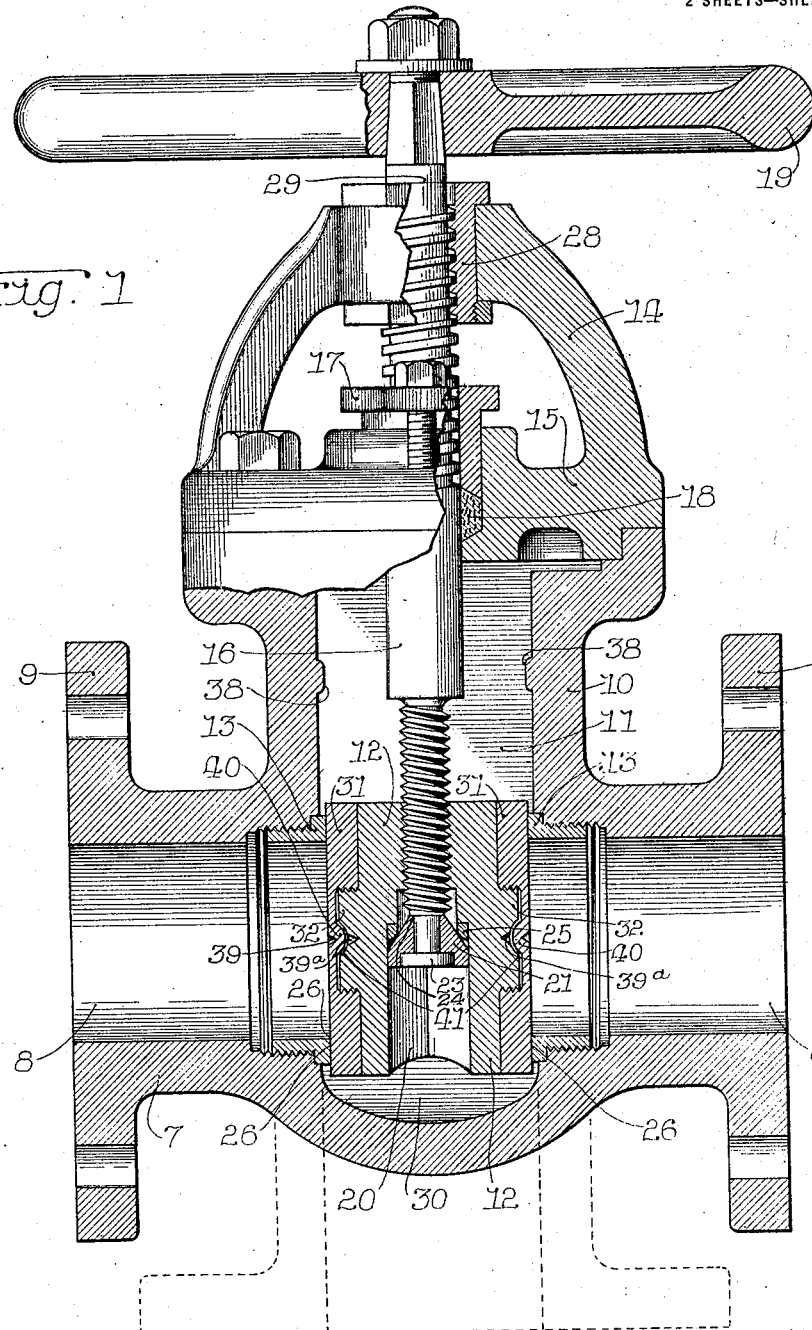

1,328,098.

Patented Jan. 13, 1920.
2 SHEETS—SHEET 2.

Inventor
John M. Palmer
By Brown, Hanson & Boettcher
Attorneys

UNITED STATES PATENT OFFICE.

JOHN M. PALMER, OF CHICAGO, ILLINOIS.

VALVE.

1,328,098.

Specification of Letters Patent.

Patented Jan. 13, 1920.

Application filed October 16, 1916. Serial No. 125,784.

*To all whom it may concern:*

Be it known that I, JOHN M. PALMER, a citizen of the United States, residing at Chicago, in the county of Cook and State of Illinois, have invented a certain new and useful Improvement in Valves, of which the following is a full, clear, concise, and exact description, reference being had to the accompanying drawings, forming a part of this specification.

My invention relates to valves for controlling the flow of fluids or gases.

In my copending application, Serial No. 16,834, filed March 25th, 1915, I have described means for spreading the valve member or gate so that it will engage firmly its seat or seats to prevent absolutely the passage thereby of the fluid intended to be controlled. The spreading action of the valve member is secured automatically by the operation which closes the valve, being a resultant of continued actuation of the valve handle after the valve member has reached its closing position.

The object of my present invention is to increase the life of the valve, and consistent with this object, I provide interchangeable facing seats or caps for the valve member, which seats or caps may be replaced readily at slight expense should the valve start to leak. In order to increase the durability of the valve member and the facing seats, it is important that there be no tendency for the valve member to move upwardly or downwardly while the spreading action takes place, and to that end I construct and arrange the parts so that the valve gate will be suspended freely or "floating" when in the closed position.

A further object of my invention is to so construct and arrange those parts of the valve, which are subject to the action of the fluid or gas to be controlled and which must be replaced or renewed at certain intervals, so that there will be no tendency for these parts to work loose or become displaced due to long continued operation of the valve.

A further object of my invention is to so arrange the parts that there will be no chafing of the faces of the gate member against the valve seats when the gate is in its closed position and being jammed against the seats.

These and other objects of my invention will be more clearly understood by reference to the accompanying drawings in which—

Figure 1 is a vertical axial cross-sectional view of a valve embodying my invention, a portion being shown in full to show the manner in which the yoke is attached to the valve body;

Figure 6:
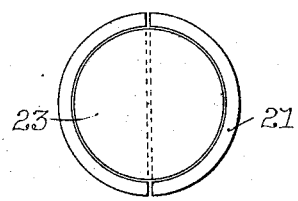
Fig. 6 is a bottom view of the valve stem and thimble shown in Fig. 5.
Figure 2:
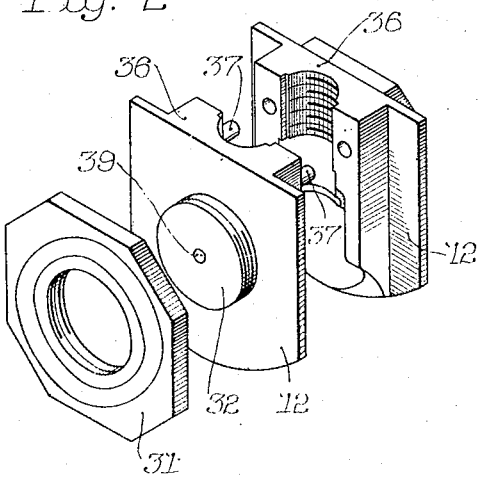
Fig. 2 is an enlarged detail view of the valve members, illustrating also a modified form of valve seats.
Figure 5:
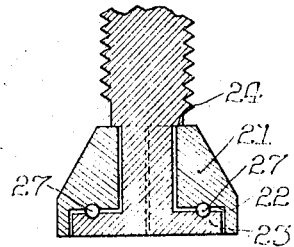
Fig. 5 illustrates an enlarged view of a modified form of thimble carried on the end of the valve stem to spread the valve members.

Referring first to Fig. 1, it will be seen that I provide a valve body 7 which is provided with the inlet and outlet openings 8, 8 which are surrounded by the flanges 9, 9 for the purpose of making connections to a pipe line. The valve here shown is a key valve and the upright portion 10 of the body is provided with a rectangular chamber 11 for the reception of the movable valve member or gate 12. This gate, as illustrated in Fig. 2, is centrally divided and when in its lower position is adapted to fit snugly in the space between the valve seats 13, 13 which seats are screw-threaded into the inlet and outlet openings 8, 8 as is clearly shown in Fig. 1. The vertical dimension of the chamber 11 is sufficient to receive the valve member 12 when it is moved in its open position. The upper part of the upright portion 10 is made circular and is adapted to receive the yoke member 14 which may be bolted to the valve body. The lower portion 15 of the yoke member 14 is provided with an opening through which the valve stem 16 may be inserted. The valve stem 16 may be packed by means of the packing cap or gland 17 which holds the packing 18 firmly in place about the valve stem. The valve stem is provided with the hand wheel 19. The lower part of the stem 16 is screw threaded into the joined parts of the valve gate 12. The valve stem 16 may be differentially threaded, the lower threads running in one direction and the upper threads in an opposite direction. This is not essential as it will at once be apparent that the upper and lower threads may be cut in the same direction if so desired, it being sufficient to make the pitches of these threads different. I prefer to make the lower threads of U. S. standard V type. The under side of the gate 12 is provided with a cylindrical pocket 20 which is adapted to receive the thimble or tapered spreading sleeve 21. As shown in Figs. 5 and 6, the thimble 21 is made in two sections, the lower central portions of which being provided with a recess 22 to receive the head 23 of the stem 16.

Just above the head 23 the valve stem is reduced in diameter to form a shoulder 24 between which shoulder and the head 23 the thimble sections 21—21 are interposed. This arrangement prevents the thimble from working out of place when the valve gate is being lowered. The upper portions of the thimble are oblique to form a wedging head which engages the shoulder 25 of the valve gate as clearly shown in Fig. 1.

In Fig. 1 I have shown the shoulder 25 in the form of a ring, separate from the gate members 12, which may be held in place in any suitable manner. The gate members may be made of a relatively soft metal and the ring 25 of a relatively hard metal to withstand better the wedging action of the thimble 21. The shoulder 25 may be made integral with the gate members in which case I prefer to chill or case harden the same.

The gates 12—12 are held against rotation further than to allow the gates to rock about the wedging symbol 21 as a fulcrum, sufficiently to cause the flat outer faces of the facing seats 31—31 to contact and adjust themselves properly to the valve seats 13—13, by means of their relative snug engagement in the square chamber 11. Thus when the hand wheel 19 is turned in a counter clockwise direction, the stem 16 will rise in the chamber 11 and the gates 12 will rise about the stem 16. In this way the gate 12 will travel upwardly faster than the stem itself, the rate of travel depending on the relative pitches of the upper and lower threads of the stem and only a few turns are required to open the valve to full open position.

When the wheel 19 is turned in a clockwise direction, the stem 16 will move downwardly and the gate 12 will travel downwardly on the stem 16 at a rate of speed equal to that of the stem. When the gate 12 reaches its lowermost position the shoulder 25 engages with the oblique surface of the wedging thimble 21, carried on the stem, and a spreading or wedging action begins and continues with the continued movement of the hand wheel 19 in a clockwise direction. This spreading action is due to the wedging of the two members of the gate 12 down upon the wedging thimble 21 and in this way the two halves of the gate member are firmly jammed against the seats 13, 13 and an absolutely closed joint is provided at 26, 26. The purpose of making the wedging thimble separate from the valve stem is to reduce friction between the shoulder 25 of the gate 12 and the oblique surface of the thimble. In the larger sizes of valves I may employ ball bearings 27, 27 between the thimble and the head 23 of the valve stem as shown in Fig. 5. While the upper threads and lower threads on the valve stem may be of the same type and of the same pitch, I have shown the upper threads of a greater pitch and of a square type to more clearly illustrate an important feature of my invention.

After the valve gate has been lowered to its lowest position and the spreading action begins to take place, it is desirable that the valve stem may be free to move in the adjusting nut 28 carried in the upper portion of the yoke 14. The reduced portion of the adjusting nut 28, which reduced portion extends through the yoke 14, is externally threaded adjacent its lower end for the reception of a suitable clamping collar 50, whereby the adjusting nut is securely clamped in the yoke 14. In order to accomplish this result it will be seen, by reference to Fig. 1, that the upper parts of the uppermost threads on the stem 16 are cut off which, in effect, reduces the width of the threads and permits the stem to move a certain extent without any binding action in the adjusting nut 28. It is important that the respective parts be in proper position relative to each other and to facilitate assembling of the valve I provide the hair line 29 on the stem. The valve stem is first inserted in the yoke and turned until the hair line is even with the top of the adjusting nut 28. The thimble and gate sections are next placed on the valve stem and turned about the same until the spreading action starts to take place, which is an indication that the valve gate is at the proper place on the valve stem with respect to the position of the valve stem in the adjusting nut 28. The assembled gate may now be placed in the valve body in its closed position and the valve stem turned slightly in a clockwise direction to spread the gate members and hold the same in closed position while the yoke member 14 is bolted or secured to the valve body.

In normal operation the adjusting nut 28 is locked in place by the collar 50. When the gate is wedged firmly to its seat it will be noted that the narrow threads on the stem are within the adjusting nut, thus giving a limited amount of clearance. By loosening the collar 50 the adjusting nut may be turned a limited distance without rotating the valve stem and to bring this clearance above or below the threads. In practice, after the gate has been inserted and wedged to its seat the adjusting nut is turned so that all of the clearance comes on the side of the thread toward which the stem moves in loosening the wedge. In the form shown, the wedge is loosened by a downward movement and, therefore, in assembling the adjusting nut 28 is so positioned that all of the clearance comes below the threads of the stem when the wedge is in final position. The adjusting nut is then firmly clamped in this position by the collar 50. When the valve is to be opened the valve stem may be rotated and while the wedge is releasing the gate parts the thread of the stem will be moving down through its clearance space. When the loosening of the gate parts is effected the threads will have reached the lower end of their clearance in the nut 28 and further rotation of the stem will effect an upward rather than a downward movement of the stem.

When the valve is thus assembled and when the spreading action begins to take place the valve stem will have traveled downwardly far enough so that the full size threads on the upper portion of the valve stem no longer engage the threads in the adjusting nut 28.

Once the spreading action begins one of two results must follow, namely, either the gate member must travel downwardly chafing against the seats or the gate member will stand still in the tranverse plane and the valve stem move upwardly. By cutting away the upper portion of the threads on the stem 16, which threads coöperate with the threads in the bushing 28, clearance space is provided and the stem may move upwardly enough to permit the gate member to be jammed against the valve seats without chafing.

It will now be apparent that all tendency for the valve gate to move upwardly or downwardly while the spreading action takes place is done away with and that there is no possibility of the valve gate chafing against its seats. When in the closed position the valve member is freely suspended or "floating" between the seats 13, 13. the stem being free in the yoke 14. The clearance space 30 is provided beneath the gate 12 so that the gate will be freely suspended or "floating" even when in its lowermost position.

Figure 4:
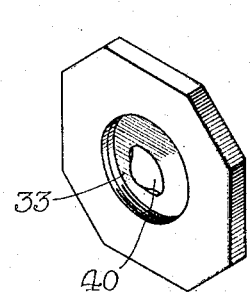
Fig. 4 illustrates another form of facing seat adaptable to either of the forms of valve members shown in Figs. 1 and 2.

In order to increase the life of the valve and to reduce to a minimum the cost of repairs, I provide facing seats 31, 31 on the gate members 12, 12. Referring now to Fig. 1 it will be seen that I provide externally threaded hubs 32, 32 on the gate members which are adapted to receive the facing plates. In Figs. 1 and 4 I have illustrated what I term "cap seats" this being the preferred form of facing plate since this type presents a solid face to the fluid or gas to be controlled and there is no possibility of the fluid or gas escaping through the valve by way of the hubs 32, 32. The seats 31, 31 are provided with a recess 33 internally screw-threaded so that the same may be threaded on the hubs 32. In Fig. 2 I have illustrated a modified form of facing plate and what I term an "open seat."

Figure 3:
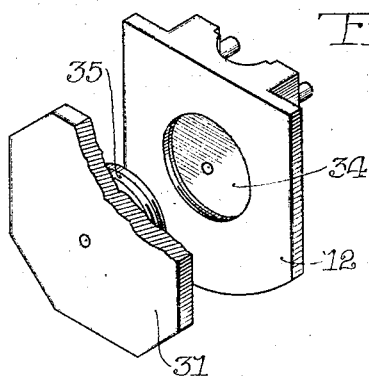
Fig. 3 illustrates one section of a modified form of valve member with its coöperating facing seat.

In Fig. 3 I have shown a modified form of gate member and its coöperating cap seat. The gate member is provided with an internally screw-threaded recess or pocket 34 and the cap seat 31 is provided with an externally screw-threaded hub 35. The construction is similar to that shown in Figs. 1 and 2 except the hub is carried on the cap instead of being carried on the gate member.

The facing seats may be made of any suitable material such as chilled or case-hardened steel, or any other metal, and in some instances it may be desirable to make them from fiber, wood or paper. If the facing seats become worn in spots, they may be refaced by placing the gate members and the seats in a lathe and resurfacing the seats with a suitable tool or by filing or grinding the seats in any suitable manner. Should the facing seats require resurfacing to such an extent as to make them too thin for use in the ordinary manner, they may be shimmed up by placing a thickness of some suitable material between the seats and the gate members. The open seat has an advantage over the cap seat in that it may be turned over and both sides used.

The contour of the facing seats may be of any convenient shape but I prefer to make them polygonal. I find that by making these seats octagonal as shown, removal and replacement of the seats is greatly facilitated, such a formation also preventing the valve seats from working loose from their respective gates by reason of the relative snug engagement of the seats in the square chamber 11.

The flat edges of the facing seats serve also to prevent the seats from turning on the hubs 32 after the valve is assembled, the distance across opposite edges of the seats corresponding to the width of the square chamber 11, allowance being made however so the seats will move freely with the gate when the same is raised or lowered.

It will be seen from Fig. 2 that the gate members are provided with squared shoulders 36 which make it convenient to hold the same with one wrench and to remove or replace the facing seat with another wrench.

The dowel pins 37, 37 are provided to keep the members 12—12, in proper alinement when the gate is being raised or lowered. These couplings or dowel pins are not necessarily formed integral with the gate member 12. Either of the gate members could be drilled and counter-sunk for the reception of suitable headed coupling pins if so desired, leakage through the drill holes provided for such pins being effectively prevented by the cap or facing seat 31. By referring to Fig. 1 it will be seen that I provide the lugs 38, 38 on the walls of the chamber 11. When the valve gate is raised these lugs in coöperation with the dowel pins 37, 37 effectively prevent disarrangement of the gate sections and thimble sections carried on the stem 16.

The gate members are provided also with the center holes 39 to facilitate holding the gate sections in proper position when finishing in a lathe. The dowel pins 37, 37 are useful also in this connection to hold the parts in correct alinement. On the inner side and in the center of the cap form of facing seat I provide the boss 40 which makes it possible to form the center hole 39 in the cap. The hub of the gate member is recessed at 41 to provide for the reception of the boss 40. A center hole 39$^a$ is provided in the gate hub so that the gate members may be finished in the lathe without the facing seats if desired.

Figure 7:
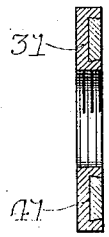
Fig. 7 is a cross sectional view of a modified form of facing seat.

In Fig. 7 I have shown in cross sectional view a modified form of facing seat. The facing seat 31 is provided with a groove 41 which may be filled with Babbitt or any other suitable metal. In this type of facing seat I secure a hard face on one side of the same and a face of softer metal on the other side, thus embodying in one piece a seat which may be used in different kinds of service.

I prefer to employ the seat rings 13, 13 in the body of the valve but these are not absolutely necessary as it is obvious that the body of the valve may be ground off to form a seat for the gate members.

It will now be seen that should the valve leak by reason of severe usage or long continued wear that the facing seats 31, 31 may be re-surfaced or replaced at slight expense, and if the seat rings 13, 13 are worn, these also may be re-surfaced or replaced at slight expense, thus reducing to a minimum expenditures for repairs.

In Fig. 1 I have shown in dotted outline an angle valve and it will be apparent to those skilled in the art that my improvements may be embodied in an angle type of valve as well as the straight type.

While I have described more or less precisely the details of construction, I do not wish to be understood as limiting myself thereto, as I contemplate changes in form, the proportion of parts, and the substitution of equivalents, as circumstances may suggest or render expedient without departing from the spirit of my invention.

What I claim is:

1. In a valve, a body, a gate reciprocating in said body, a stem threaded in said body and threaded in said gate, said threads being in opposite directions and a wedging member on said stem for spreading said gate, the threads on said stem being out of engagement with the threads in said body when the spreading action takes place.

2. In a valve, a body, a gate reciprocating in said body, a stem threaded in said body and threaded in said gate, said threads being in opposite directions and a wedging member on said stem for spreading said gate, said stem being free to move upwardly while the spreading action takes place.

3. In a valve, a body, a gate reciprocating in said body, a stem carried by said body and supporting said gate, a wedging member on said stem for spreading said gate, said stem being free to move upwardly while the spreading action takes place.

4. In a valve, a body, a gate reciprocating in said body, a stem carrying said gate, a wedging member on said stem for spreading said gate, a ring of relatively hard material on said gate and bearing against said wedging member, said gate being capable of rocking universally about said wedging member as a fulcrum to insure proper operation of said gate and a reversible open seat on said gate.

5. In a valve, a body, an expansible gate reciprocating in said body, a stem carrying said gate, a wedging member on said stem for spreading said gate, a removable facing seat on said gate and means on said gate and said facing seat for centering the same in a tool for finishing or resurfacing.

6. In a valve, a body, an expansible gate adapted for reciprocation in said body, a stem carrying said gate, a wedging member on said stem for spreading said gate, a reversible open seat on said gate, and means on said gate for centering same, for finishing or resurfacing.

7. A valve including a body, a gate therein, a valve stem having threaded connections to said body and separate threaded connections to said gate whereby upon rotation of said stem, the latter is moved endwise in respect to said body and said gate is moved endwise in respect to said stem, and a wedging member for spreading said gate upon movement of said stem and gate past predetermined relative positions, the threaded connections between said stem and said body permitting limited endwise movement of said stem independently of the threads and permitting said gate to be held against endwise movement during the spreading movement.

8. A valve having a body, a two part gate, a valve stem, a wedging member on said stem for spreading said gate and forcing the two parts thereof against their respective seats, connections between said stem and said body, and connections between said stem and said gate whereby a rotation of said stem effects a longitudinal movement of the stem in respect to the body and a longitudinal movement of the gate in respect to the stem at predetermined relative rates, said connections being such that said stem may move endwise in respect to said body and said gate without endwise movement of the latter during the spreading action.

9. A valve having a body, a gate adapted for reciprocation therein, a stem having threaded connections to said gate, a wedging member carried by said stem for spreading said gate and forcing it against its seat and a member having threaded connections to said stem providing clearance and adjustably secured to said body whereby the relative position of said clearance may be varied.

10. A valve having a body, a gate, an adjusting member mounted on said body, a stem threaded in said adjusting member and threaded in said gate, means on said stem for spreading said gate, an axial movement of said stem being permitted relative to the threads in such adjusting member when spreading action takes place, by the provision of clearance between said threads and the coöperating threads on the stem, the adjusting movement of said member in respect to said body permitting the adjustment of the clearance to either side of the threads of the stem.

11. A valve having a body, a gate, a member normally rigid with said body, a stem threaded in said member and threaded in said gate and wedging means on said stem for spreading said gate, the portions of the thread on said stem engaging in said member at the time the spreading action takes place being narrower than the threaded grooves of said member and said member being rotatably adjustable on said body to permit assembling with the clearance space at the desired side of the threads of the stem when the wedging action is complete whereby axial movement of said stem within said member and independently of said threads may take place during the spreading or releasing action.

12. A valve having a two part valve gate, a valve stem having threaded engagements with both parts and extending therebetween a wedge carried by said valve stem, and guiding coupling means between said parts on opposite sides of said stem for preventing relative movement of said parts other than a spreading movement.

13. A valve having a body provided with a chamber, a gate adapted for reciprocation in said chamber, a facing seat having threaded connections to said gate, means for reciprocating said gate in a direction substantially at right angles to the plane of the facing seat and the axis of the threaded connections, said facing seat having oppositely disposed, substantially parallel edges adapted for coöperation with the sides of said valve chamber to prevent unscrewing of said facing seat when in said chamber.

In witness whereof, I hereunto subscribe my name this 14th day of October, A. D. 1916.

JOHN M. PALMER.